United States Patent [19]
Silk

[11] Patent Number: 6,124,958
[45] Date of Patent: Sep. 26, 2000

[54] MANUFACTURING METHOD AND DEVICE FOR A WIRELESS LOCAL AREA NETWORK OPTICS FIXTURE ARRAY

[75] Inventor: S. David Silk, Lake In The Hills, Ill.

[73] Assignee: Motorola, Inc., Schaumburg, Ill.

[21] Appl. No.: 08/731,891

[22] Filed: Oct. 22, 1996

[51] Int. Cl.[7] .................................................. H04B 10/00
[52] U.S. Cl. ........................ 359/172; 359/125; 359/137; 359/159
[58] Field of Search .................. 359/125, 137, 359/159, 172

[56] References Cited

U.S. PATENT DOCUMENTS

| | | | |
|---|---|---|---|
| 4,387,961 | 6/1983 | Winston | 350/296 |
| 4,988,205 | 1/1991 | Snail | 356/446 |
| 5,291,331 | 3/1994 | Miano et al. | 359/598 |
| 5,359,446 | 10/1994 | Johnson et al. | 359/152 |

*Primary Examiner*—Edward Lefkowitz
*Attorney, Agent, or Firm*—Darleen J. Stockley

[57] ABSTRACT

A manufacturing method (700) and device ((100, 200, 300, 400, 500, 600) provide a fixturing frame with an optics array alignment for a wireless local area network optics fixture array that has a plurality of circumferential cavities for collecting and detecting optical signals to achieve a quasi-diffuse collection/reception pattern.

6 Claims, 5 Drawing Sheets

MANUFACTURING METHOD AND DEVICE FOR A WIRELESS LOCAL AREA NETWORK OPTICS FIXTURE ARRAY

FIELD OF THE INVENTION

The present invention relates to wireless LAN optics devices, and more particularly, to the manufacture of wireless local area network (LAN) optics devices.

BACKGROUND OF THE INVENTION

In the design of optical transceivers for wireless local area network (LAN) applications, there is a need to make the system as non-directional as possible while minimizing cost, complexity, and transmitted optical power. The system designer is challenged with devising a scheme to maximize the collection and concentration of the transmitted optical energy without significantly reducing the field of view of the transceiver. The optics required to convert the modulated optical signal may represent a significant portion of the direct material cost of the transceiver.

An optimal method to collect and concentrate the optical signal is the compound parabolic concentrator (CPC), described in High Collection Nonimaging Optics by W. T. Welford and R. Winston, Academic Press ©1989. The CPC may be formed from a cavity with reflective interior walls, or from a solid, transparent dielectric material employing total internal reflection. Solid CPCs provide an enhancement in concentration which is proportional to the square of the index of refraction of the material from which they are formed.

An example of a photodiode alignment structure known in the prior art is the MFOD71 fiber optics photodetector described in Optoelectronics Device Data, Motorola, Inc. ©1989. This device is designed to retain and align a photodiode with a 1000 micron core plastic fiber, but it does not provide orientation for a plurality of devices or address the need for an optical bond.

Accordingly, there exists a need for a cost-effective method and device to provide alignment for a plurality of photodiodes and associated CPCs, and to provide a fixture for retaining a solid CPC during the process of optically bonding the exit aperture to a photodiode.

DETAILED DESCRIPTION OF A PREFERRED EMBODIMENT

Figure 1:
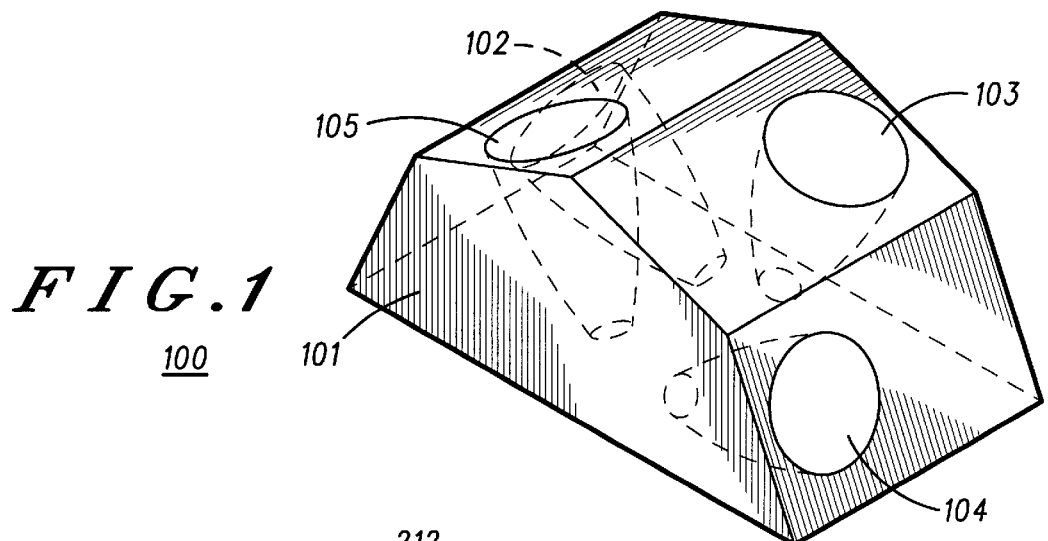
FIG. 1 is a graphic representation of a molded/machined fixturing frame to accept compound parabolic concentrators (CPCs) to provide an extended field of view collection/reception pattern.

FIG. 1, numeral 100, is a graphical representation of a fixturing device, that includes a fixturing frame (101) and circumferential cavities (102), (103), (104), and (105) in accordance with the present invention. The spatial orientation of a plurality of circumferential cavities, with acceptance angles that are substantially non-overlapping, achieves full 180° coverage in the azimuth providing quasi-diffuse performance. Quasi-diffuse performance relates to the system performance in which the transmitter and the receiver have extended angular coverage provided in the emitter of the transmitter and the collector of the receiver. Since a direct line of sight has less path loss than a diffuse path with reflections, a predetermined range can be achieved with less transmitter power for a quasi-diffuse path.

An array of photodiodes with associated CPCs is required to provide a wireless optical transceiver with an extended field of view. Each photodiode must be aligned with the optical axis of its CPC and, if solid CPCs are employed, the photodiodes must also be optically bonded to the CPC exit aperture using epoxy or gel to minimize internal reflection at the interfacing boundary.

The fixturing frame may be constructed, molded or machined to provide a frame that provides optics array alignment for a wireless local area network optics fixture array. The fixturing frame typically includes a predetermined number of circumferential cavities for collecting and detecting optical signals to achieve a quasi-diffuse collection/reception pattern. The compound parabolic concentrators, CPCs, for the fixturing frame may be formed by providing polygonal or cylindrical or conical units that have reflective/coated inner surfaces for reflecting optical signals and are shaped for insertion into the fixturing frame. The CPCs may also be formed by coating circumferential cavities that have been molded or machined in the fixturing frame with a reflective material.

The compound parabolic concentrator fixturing frame may have a plurality of walls or support members that provide circumferential cavities for alignment and retention of a predetermined number of compound parabolic concentrators to achieve the quasi-diffuse collection/reception pattern for a wireless local area network optics fixture array. The frame may also include a plurality of symmetrical interlocking individual sections that provide a circumferential cavity for alignment and retention of the predetermined number of CPCs while still maintaining a predetermined collection/reception pattern.

Figure 2:
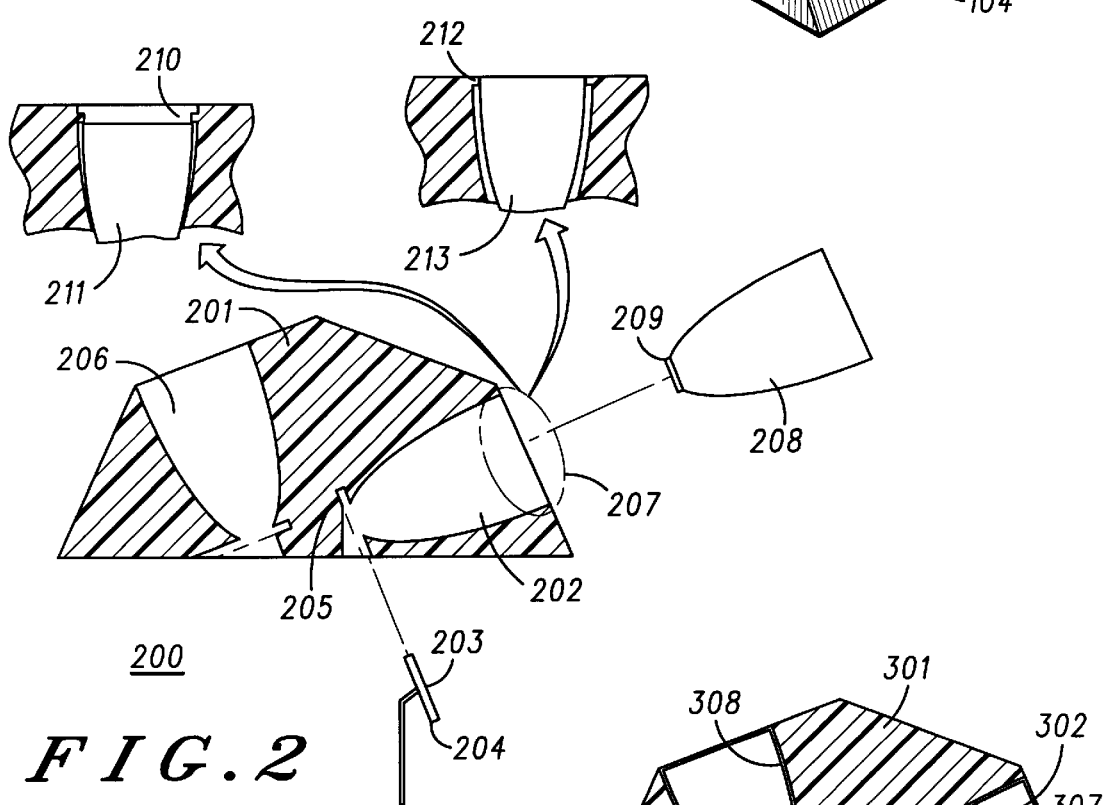
FIG. 2 is a graphic representation of a cutaway side view bisecting in a plane the circumferential cavities of the fixturing frame in accordance with the present invention.

FIG. 2, numeral 200, is a graphical representation of a cut-away view of the fixturing frame (201) bisecting circumferential cavities (202) and (206) in a plane in accordance with the present invention. CPC (208) is inserted into fixturing frame (201) to contact with mounted photodiode (203) on lead formed header (204) inserted into slot (205) of fixturing frame (201) providing the required mechanism to collect incident light rays for photodetection. By applying index matching epoxy/optical matching jell (209), CPC (208) can be optically, and may also be mechanically, joined to the photodiode (203) mounted on the lead formed header (204). Photodiode (208) is captured in the circumferential cavity (202) by mechanical detail (207) located at the entrance of the circumferential cavity (202). The mechanical detail (207) provides a means to retain CPC (208) in the circumferential cavity (202). Mechanical detail (207) may be in the form of raised bumps (210) located around the top opening of circumferential cavity (202). Also, mechanical detail (207) may be in the form of a raised ring (212) around the opening of a circumferential cavity (202).

Figure 3:
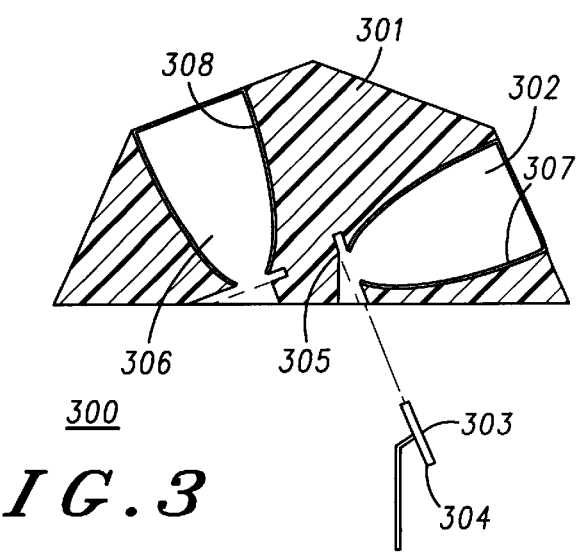
FIG. 3 is a graphic representation of a cutaway side view bisecting in a plane the circumferential cavities of the fixturing frame in accordance with the present invention illustrating a coating/finishing for the interior surface of the circumferential cavities with a reflective material eliminating the need for assembly with solid CPCs.

FIG. 3, numeral 300, is a graphical representation of a cut-away view of the fixturing frame (301) bisecting circumferential cavities (302) and (306) in a plane in accordance with the present invention. The inner surface of circumferential cavities (302) and (306) are finished with reflective material (307). Inserting photodiode (303) mounted on lead formed header (304) into slot (305) of fixturing frame (301) completes the system for collecting the incident light rays for photodetection.

Figure 4:
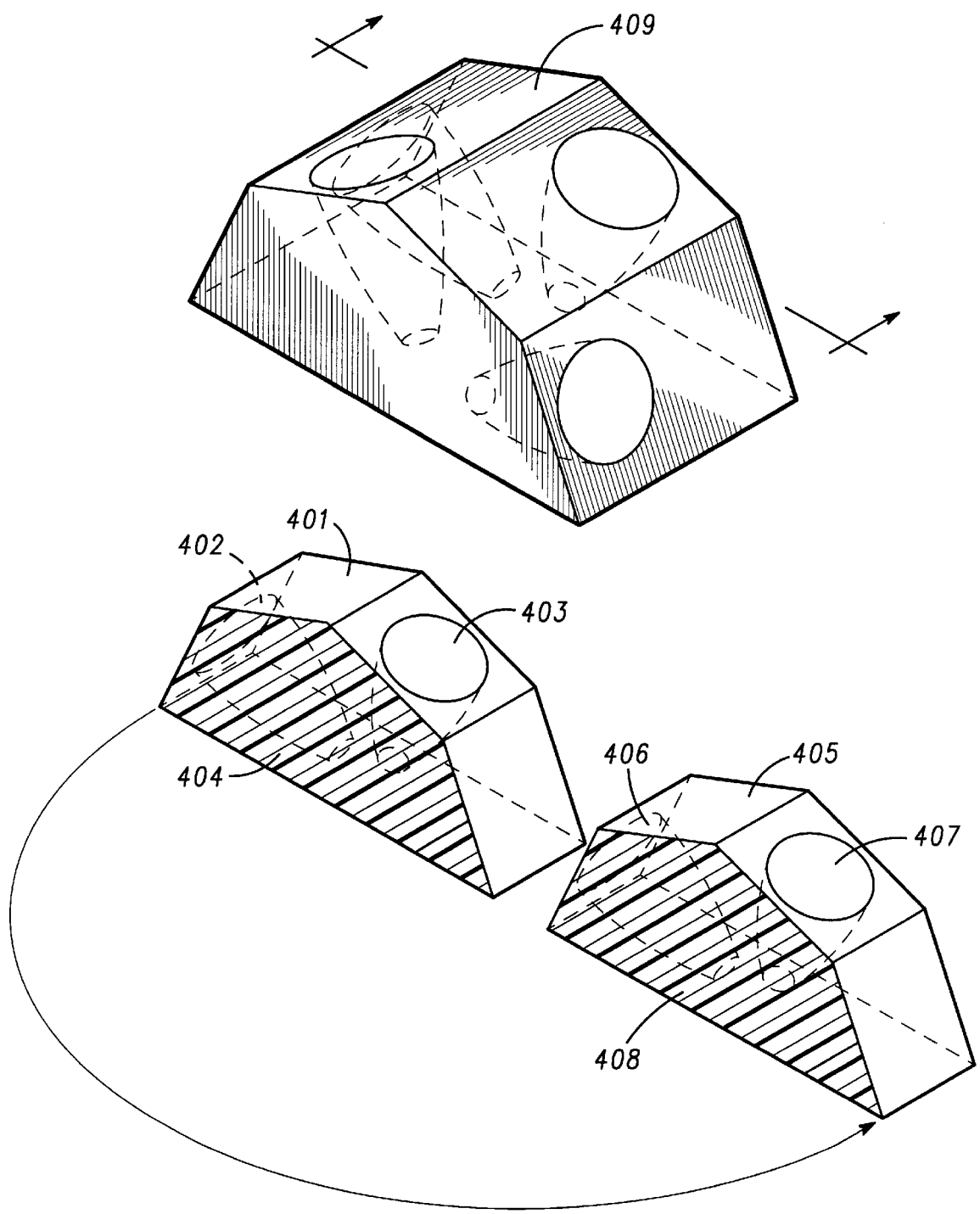
FIG. 4 is a graphic representation of a fixturing frame having a plurality of symmetrical interlocking individual sections providing the predetermined number of circumferential cavities for alignment and retention of the CPCs while still maintaining the predetermined collection/reception pattern.

FIG. 4, numeral 400, is a graphical representation of an exploded view of a plurality of symmetrical interlocking individual sections (401) and (405) providing circumferential cavities (402), (403), (406), and (407) for alignment and retention of the predetermined number of CPCs while still maintaining a predetermined collection/reception pattern in accordance with the present invention. (401) and (405) are identical structures. After the predetermined number of CPCs and photodiodes mounted to headers have been assembled as described in FIG. 2, fixturing frame (401) may be mated to fixturing frame (405) by attaching mating surface (404) of fixturing frame (401) to mating surface (408) of fixturing frame (405). The completed assembly (409) will then have a mating seam in the center of the structure as illustrated.

Figure 5:
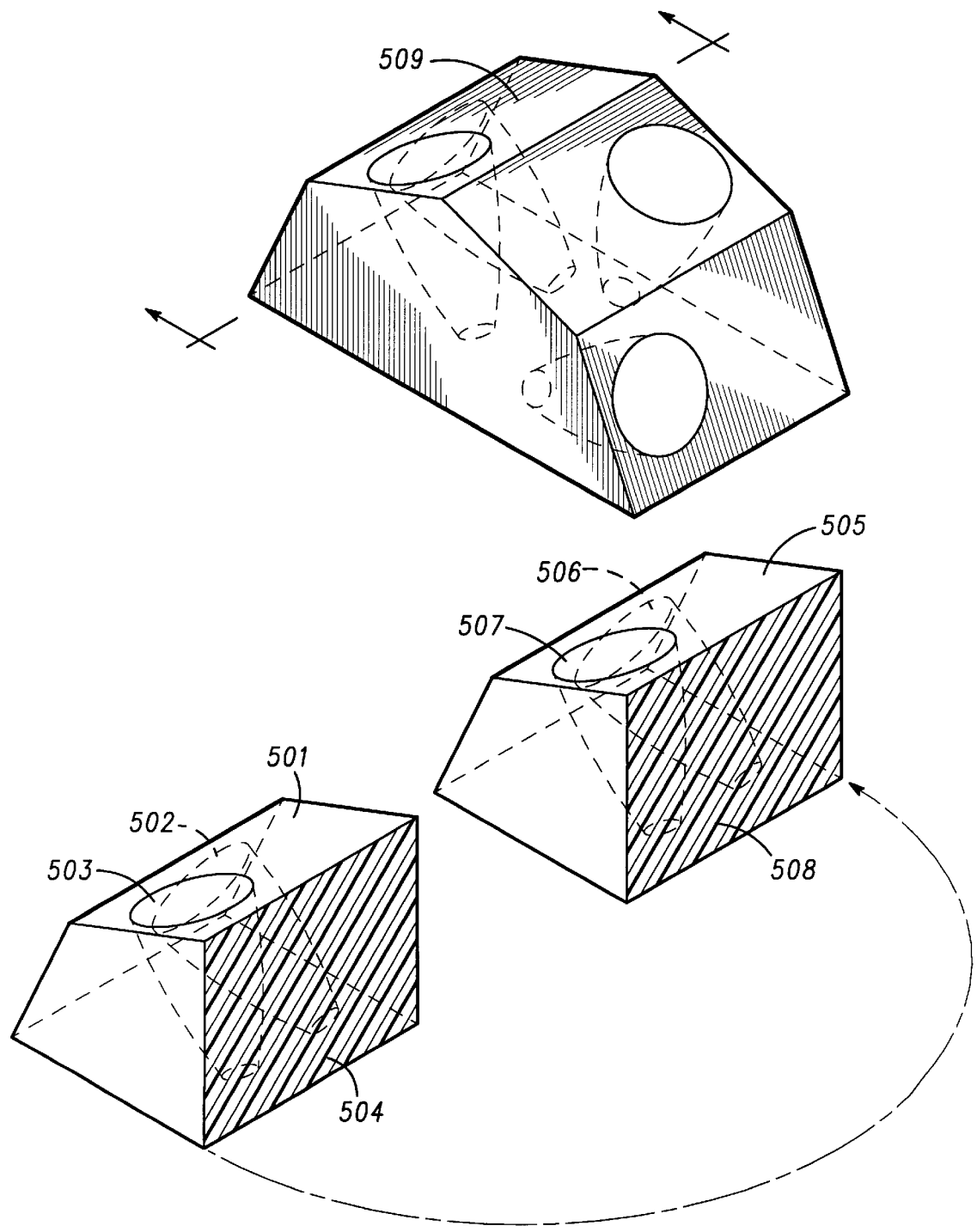
FIG. 5 is a graphic representation of a fixturing frame having a plurality of symmetrical interlocking individual sections providing the predetermined number of circumferential cavities for alignment and retention of the CPCs while still maintaining the predetermined collection/reception pattern.

FIG. 5, numeral 500, is a graphical representation of an exploded view of a plurality of symmetrical interlocking individual sections (501) and (505) providing circumferential cavities (502), (503), (506), and (507) for alignment and retention of the predetermined number of CPCs while still maintaining a predetermined collection/reception pattern in accordance with the present invention. (501) and (505) are identical structures. After the predetermined number of CPCs and photodiodes mounted to headers have been assembled as described in FIG. 2, fixturing frame (501) can be mated to fixturing frame (505) by attaching mating surface (504) of fixturing frame (501) to mating surface (508) of fixturing frame (505). The completed assembly (509) will then have a mating seam in the center of the structure as illustrated.

Figure 6:
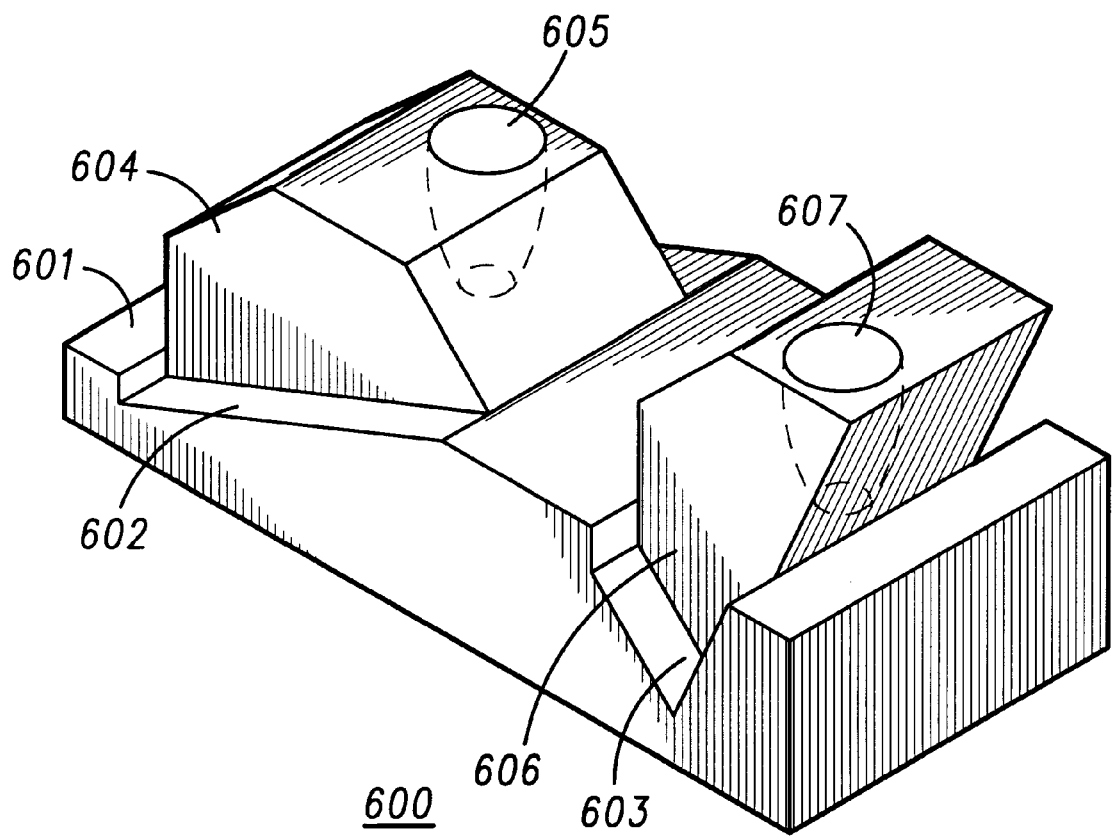
FIG. 6 is a graphic representation of a palette slotted to accept a fixturing frame for up-right alignment of the predetermined number of circumferential cavities to facilitate the assembly in accordance with the present invention.

FIG. 6, numeral 600, is a graphical representation of a palette (601) designed to hold and position a predetermined number of circumferential cavities in an up-right position, one at a time, to facilitate assembly of the mounted photodiode on lead formed header with a CPC in accordance with the present invention. (602) is a slot designed to hold fixturing frame (604) in an up-right position to facilitate assembly of the mounted photodiode on a lead formed header with a CPC in circumferential cavity (605). (603) is a slot designed to hold fixturing frame (606) in an up-right position to facilitate assembly of the mounted photodiode on lead formed header with a CPC in circumferential cavity (607).

Figure 7:
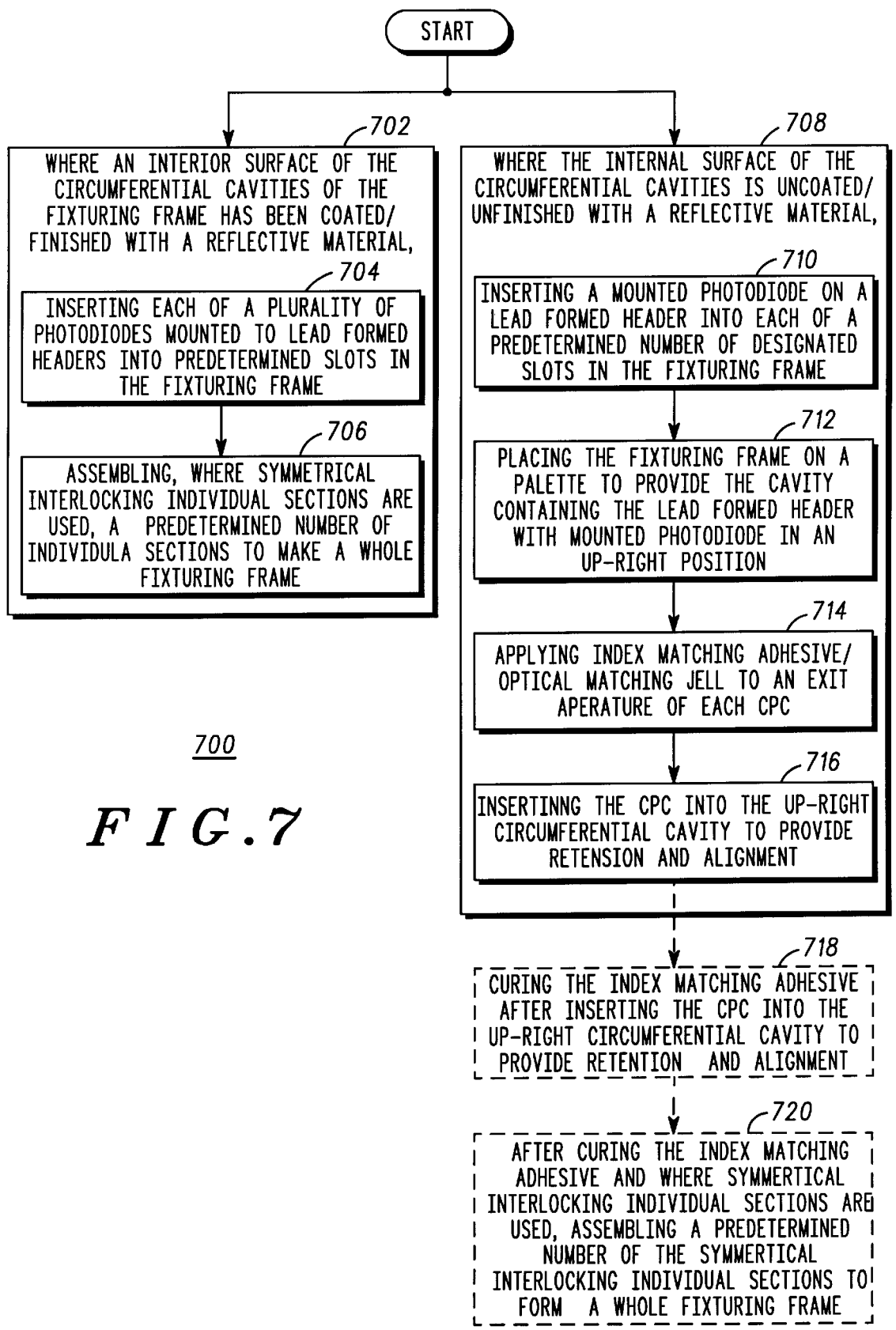
FIG. 7 is a flow diagram of one embodiment of steps of a method in accordance with the present invention.

FIG. 7, numeral 700, is a flow diagram of one embodiment of steps of a method in accordance with the present invention. The method provides for fabricating a fixturing frame to provide optics array alignment for a wireless local area network optics fixture array, wherein the fixturing frame has a predetermined number of circumferential cavities for collecting and detecting optical signals to achieve a quasi-diffuse collection/reception pattern.

The method includes the steps of: where an interior surface of the circumferential cavities of the fixturing frame has been coated/finished with a reflective material (702), inserting (704) each of a plurality of photodiodes mounted to lead formed headers into predetermined slots in the fixturing frame; and assembling (706), where symmetrical interlocking individual sections are used, a predetermined number of individual sections to make a whole fixturing frame; and where the circumferential cavities are uncoated/unfinished with a reflective material (708), inserting (710) a mounted photodiode on a lead formed header into each of a predetermined number of designated slots in the fixturing frame, placing (712) the fixturing frame on a palette to provide the cavity containing the lead formed header with mounted photodiode in an up-right position, applying (714) index matching adhesive/optical matching jell to an exit aperture of each CPC, and inserting (716) the CPC into the up-right circumferential cavity to provide retention and alignment. Where selected, after inserting the CPC into the up-right circumferential cavity to provide retention and alignment, the method may include curing (718) the index matching adhesive, typically by ultraviolet light or heat. After curing the index matching adhesive and where symmetrical interlocking individual sections are used, the method may also include the step of assembling (720) a predetermined number of the symmetrical interlocking individual sections to form a whole fixturing frame.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A fixturing frame for a wireless local area network optics fixture array, having a predetermined number of circumferential cavities formed therein, being coated with reflective material, for providing optics array alignment, wherein the fixturing frame is adapted to collect and detect optical signals in a quasi-diffuse pattern.

2. The fixturing frame of claim 1, wherein each of the predetermined number of circumferential cavities are formed to receivably contain a plurality of compound parabolic concentrators, CPCs, and wherein the CPCs are one of:

A) polygonal; and

B) cylindrical/conical.

3. A compound parabolic concentrator fixturing frame having a plurality of walls/support members forming circumferential cavities therein for providing optics array alignment and retention of a predetermined number of compound parabolic concentrators, CPCs, to achieve a quasi-diffuse collection/reception pattern for a wireless local area network optics fixture array.

4. The fixturing frame of claim 3, wherein the fixturing frame further comprises a plurality of symmetrical interlocking individual sections, wherein each symmetrical interlocking individual section provides at least one circumferential cavity for alignment and retention of the predetermined number of CPCs.

5. A method for fabricating a fixturing frame for providing optics array alignment for a wireless local area network optics fixture array, comprising the steps of:

provliding a predetermined number of circumferential cavities in the fixturing frame to receivably contain a plurality of compound parabolic concentrators, CPCs, for providing optics array alignment, collecting and detecting optical signals to achieve a quasi-diffuse collection/reception pattern;

inserting a photodiode being mounted on a lead formed header into each of a predetermined number of slots in the fixturing frame;

applying index matching adhesive/optical matching jell to an exit aperture of each CPC; and inserting each of the CPCs into each of the predetermined number of circumferential cavities to provide retention and alignment.

6. The method of claim 5 further including, after inserting each of the CPCs into each of the predetermined number of circumferential cavities to provide retention and alignment, curing the index matching adhesive.

* * * * *